US012595152B2

(12) United States Patent
Palazzola

(10) Patent No.: US 12,595,152 B2
(45) Date of Patent: Apr. 7, 2026

(54) PRECISE ELEVATOR CAR SPEED AND POSITION SYSTEM

(71) Applicant: TK Elevator Corporation, Atlanta, GA (US)

(72) Inventor: Michael Palazzola, Horn Lake, MS (US)

(73) Assignee: TK Elevator Corporation, Alpharetta, GA (US)

( * ) Notice: Subject to any disclaimer, the term of this patent is extended or adjusted under 35 U.S.C. 154(b) by 1772 days.

(21) Appl. No.: 16/785,826

(22) Filed: Feb. 10, 2020

(65) Prior Publication Data

US 2021/0245993 A1 Aug. 12, 2021

(51) Int. Cl.
*B66B 1/34* (2006.01)
*B66B 1/28* (2006.01)
*B66B 9/00* (2006.01)

(52) U.S. Cl.
CPC .............. *B66B 1/3492* (2013.01); *B66B 1/28* (2013.01); *B66B 9/00* (2013.01); *B66B 1/3415* (2013.01)

(58) Field of Classification Search
CPC ....... B66B 1/3492; B66B 3/02; B66B 5/0031; B66B 3/002; B66B 7/123; B66B 7/044; B66B 1/36; B66B 1/40; B66B 1/3415; B66B 5/0037; B66B 1/3446; B66B 5/0006; B66B 5/0018; B66B 1/28–34; B66B 1/3453; B66B 1/42; B66B 5/00; B66B 9/00
See application file for complete search history.

(56) References Cited

U.S. PATENT DOCUMENTS

| | | | | |
|---|---|---|---|---|
| 4,094,266 | A * | 6/1978 | Artt | B66B 3/00 116/64 |
| 7,493,991 | B2 | 2/2009 | Oh et al. | |
| 8,123,003 | B2 | 2/2012 | Meri et al. | |
| 8,276,716 | B2 | 10/2012 | Meri et al. | |
| 9,567,188 | B2 | 2/2017 | Huff et al. | |
| 9,771,241 | B2 * | 9/2017 | Varelius | B66B 5/0018 |
| 10,040,664 | B2 * | 8/2018 | Kangas | B66B 1/50 |
| 11,319,187 | B2 * | 5/2022 | Mochizuki | G01B 7/003 |
| 2015/0239708 | A1 * | 8/2015 | Palazzola | B66B 5/0031 187/390 |
| 2019/0062106 | A1 * | 2/2019 | Ginsberg | B66B 3/02 |
| 2020/0103251 | A1 * | 4/2020 | Lee | B66B 3/02 |
| 2021/0245993 | A1 * | 8/2021 | Palazzola | B66B 1/3492 |

FOREIGN PATENT DOCUMENTS

KR 20140056081 A * 5/2014

* cited by examiner

*Primary Examiner* — Christopher Uhlir
(74) *Attorney, Agent, or Firm* — Dinsmore & Shohl LLP

(57) ABSTRACT

An elevator car positioning system includes a plurality of magnetic field producers, each of the plurality of magnetic field producers located in a position corresponding to an entry/exit point of an elevator. A giant magnetoresistance (GMR) sensor is disposed on an elevator car of the elevator to detect individual ones of the plurality of magnetic field producers when within a given detection range of the GMR sensor and generate detection signals indicative thereof. A controller is in communication with the GMR sensor and is configured to receive the detection signals from the GMR sensor, determine a position of the elevator car relative to the entry/exit point based on the received detection signals, and generate control signals to position the elevator car.

20 Claims, 8 Drawing Sheets

PRECISE ELEVATOR CAR SPEED AND POSITION SYSTEM

FIELD

The present invention relates to the operation of an elevator system and, more particularly, to an elevator car positioning system for an elevator system.

BACKGROUND

Many elevator systems include an elevator car operatively connected to a tensioning unit with the system configured to move the elevator car through a hoistway. The elevator car operates to move individuals and items to different points in a building. The elevator car and tensioning unit or a second elevator car are typically connected with at least one elevator belt or rope that is directed over a sheave provided at an upper location within the hoistway. A hoist motor is operatively connected to the sheave to rotate the sheave to move the elevator rope thereon. As the elevator rope is advanced by the hoist motor and sheave, the attached elevator car(s) are moved within the hoistway. Alternatively, some modern elevator systems are operated without ropes or sheaves. These cable-free elevators may use linear drive systems to move one or more cars in a hoistway.

In the field of elevators, it is desirable to determine and control the speed and position of an elevator car so that the door of the passenger cabin is positioned and maintained in precise alignment with the floor of the building when passengers enter and exit the car. During operation of the elevator, the speed of the elevator car is controlled in a manner that is dependent on its position relative to a target building floor landing. The speed of the car is adjusted and stopped via signals from a controller such that the car arrives safely and comfortably in a controlled fashion at the floor landing and to present a safe egress from the car to the floor of the building. Weight change during passenger onboarding and offboarding can cause elongation or contraction of the suspension means (rope, etc.) which can cause changes of the alignment of the car to the floor, which in turn requires a re-leveling of the elevator car to maintain a precise position relative to the floor landing.

Determination of the position of the car in the hoistway may be performed by one of various positioning systems, which have some shortcomings. For example, current vane/sensor and other positioning systems require continuous detection of position throughout the hoistway, especially after a loss of power. Therefore, such systems have uninterrupted detection means installed from the top to the bottom of a hoistway requiring a significant cost at least in terms of material. Other systems employ sensors with a limited range. These position determining elements of the system are typically sensitive to dirt/dust and require a close distance from car to hoistway to allow precise and uninterrupted detection. Buildings settle and shrink over time which creates the requirement of readjustments of prior art positioning systems repeatedly which increases the cost of operating and maintaining the system.

There is a need to precisely determine the position and/or the speed of elevator cars that overcome the shortcomings of present systems. The present invention supplies the need at a reduced cost and an increase in precision while being fast and simple to install.

SUMMARY

An aspect of the invention is an elevator car positioning system that includes a plurality of magnetic field producers, each of the plurality of magnetic field producers located in a position corresponding to an entry/exit point of an elevator. A giant magnetoresistance (GMR) sensor is disposed on an elevator car of the elevator to detect individual ones of the plurality of magnetic field producers when within a given detection range of the GMR sensor and generate detection signals indicative thereof. A controller is in communication with the GMR sensor and is configured to receive the detection signals from the GMR sensor, determine a position of the elevator car relative to the entry/exit point based on the received detection signals, and generate control signals to position the elevator car.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

For purposes of the description hereinafter, the terms "upper, lower, right, left, vertical, horizontal, top, bottom, lateral, longitudinal" and other terms of orientation or position and derivatives thereof, shall relate to the invention as it is depicted in the figures. The term "configured" or "configuration" will be understood as referring to a structural size and/or shape. It is to be understood that the invention may assume alternative variations and step sequences, except where expressly specified to the contrary. It is also to be understood that the specific systems and processes illustrated in the attached drawings, and described in the following specification, are simply exemplary examples of the invention. Hence, specific dimensions and other physical characteristics related to the examples disclosed herein are not to be considered as limiting.

As used herein, the terms "communication" and "communicate" refer to the receipt, transmission, or transfer of one or more signals, messages, commands, or other types of data. For one unit or device to be in communication with another unit or device means that the one unit or device is configured to receive data from and/or transmit data to the other unit or device. A communication may use a direct or indirect connection and may be wired and/or wireless in nature. Additionally, two units or devices may be in communication with each other even though the data transmitted may be modified, encrypted, processed, routed, etc., between the first and second unit or device. It will be appreciated that numerous arrangements are possible. Any known electronic communication protocols and/or algorithms may be used such as, for example, CAN, RS485, UDP, TCP/IP (including HTTP and other protocols), WLAN (including 802.11 and other radio frequency-based protocols and methods), analog transmissions, cellular networks, and/or the like.

Figure 1:
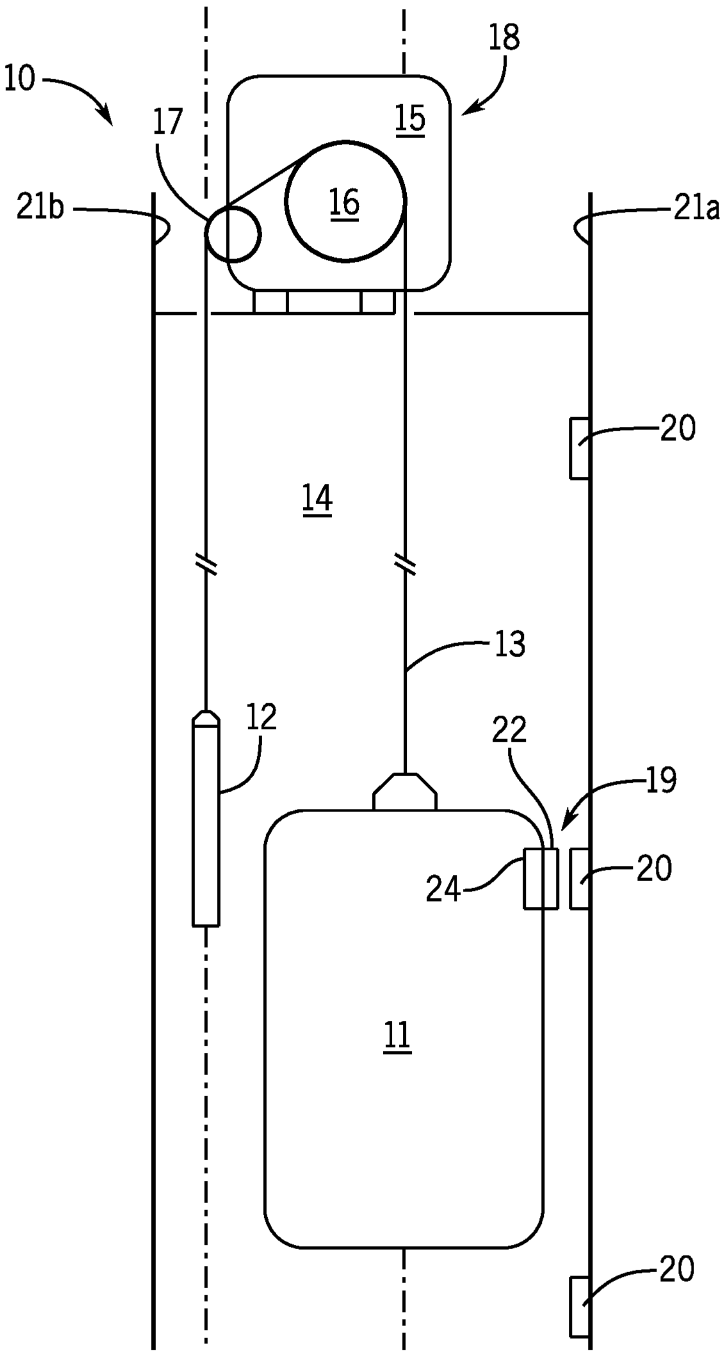
FIG. 1 is a simplified elevator system incorporating a positioning system according to the present disclosure.

An example of an elevator system 10 incorporating an aspect of the present invention is illustrated in FIG. 1, which includes a car 11 and a lift mechanism 18. The elevator system 10 includes a positioning system 19 that is in communication with the lift mechanism 18 to operate and position the car 11.

The car 11 is generally conventional in design and therefore configured for temporary occupancy of a given number of passengers and/or items to be conveyed from one place to another place of a building. The lift mechanism 18 operates to move the car 11 to predetermined positions corresponding to points of entry and exit, for example, in a hoistway 14. The hoistway 14, in the present example, is a vertical shaft with four walls, two of which 21*a*, 21*b*, are shown, and will be understood to include conventional doorways and associated door mechanisms, (not shown).

The lift mechanism 18, may include a hoist motor 15. The hoist motor 15, also referred to as an engine, may be an electric motor, and may be operationally connected to a geared or gearless transmission (not shown). The elevator system 10 can include any suitable lift mechanism 18, as will occur to those skilled in the art. Nonlimiting examples of lift mechanisms include hydraulic lifts, traction lifts, belt lifts, drum lifts, and cable-free, linear drive systems.

A sheave 16 is operatively connected to the hoist motor 15. The sheave 16 is configured to engage and advance a hoisting member 13 when the hoist motor 15 turns the sheave. The hoisting member 13 may be a rope in the form of a steel cable or a composite belt or any suitable rope-like member.

The hoisting member 13 is attached to the car 11 at one end and a tension unit 12 on an opposite end and may also run over a deflection wheel 17 that directs the path of the hoisting member around the car. The tension unit 12 may be in the form of a counterweight to offset the weight of the car 11 and passengers and/or items, such as luggage, parcels, freight, or the like.

Movement of the hoisting member 13 moves the car 11 and the tension unit 12 through a hoistway 14, in this example, in a vertical direction. It will be understood that alternative lift mechanisms that move the car vertically and/or other directions, such as horizontally, are contemplated and therefore, other designs of elevator systems will benefit from the present invention by employing the positioning system 19 disclosed herein. It will be understood that the configuration and elements of the elevator system disclosed in the present non-limiting example are to provide context to the positioning system of the present invention.

Generally, the positioning system 19 includes three main elements or sets of elements. A plurality of magnetic field producers 20 are disposed on the hoistway wall 21*a*. The magnetic field producers 20 may be each in the form of a magnetized piece of material, i.e., a magnet or a magnet housed within a container 30. Each of the plurality of magnets 20 are disposed in a position that corresponds to an individual floor or exit/entry point, i.e., one magnet per floor. In the alternative, each floor may include more than one magnet 20, wherein the plurality of magnets at each floor are arranged such that reading the magnets with a sensor will produce a signal that encodes and generates some amount of data, such as the number of the floor being sensed.

A giant magnetoresistance (GMR) sensor array 22 is disposed on the car 11 and is configured to detect a nearby magnet 20 or plurality of magnets, when in a specified range thereof and generate a signal or signals indicative of the position and/or speed of the car 11 in the hoistway 14. A controller 24 and/or warning monitor is in operative communication with the sensor 22 and is configured to receive signals from the GMR and generate control signals to control the operation of the lift mechanism 18 and optionally generate a warning signal when a predetermined condition is detected such as misalignment of the car to a doorway of a hoistway 14 when the car comes to rest.

Figure 2:
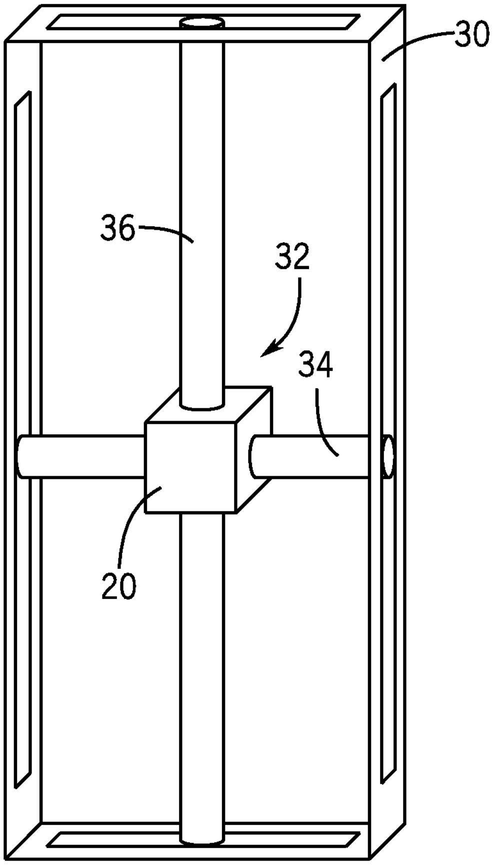
FIG. 2 is a magnet and housing assembly with a simplified X-Y positioning mechanism.

An embodiment of one of the plurality of magnets 20 is shown in FIG. 2. While it is possible to attach a magnet of enough strength to enable detection by a nearby GMR sensor or array of sensors directly on the wall 21*a* of the hoistway 14, an embodiment of an affixable and optionally adjustable magnet 20 is contemplated.

In one example, the magnet 20 is enclosed within a container or housing 30 and adjusted via an "X-Y" mechanism 32, which may be configured not unlike a positioning system such as that of a 2-D plotter or 2-D mechanism. The housing 30 is of a non-magnetic material, such as plastic. One example of such an X-Y mechanism is wherein the magnet 20 is operatively connected to a pair of intersecting screws 34, 36, wherein advancement of either of the screws causes the magnet to be moved along the length of the screw corresponding to the number of rotations of the screw and the other of the screws is permitted to move along the housing in response to movement of the magnet 20. If the screws 34, 36 are arranged at right angles to each other, the magnet 20 attached thereto can be positioned anywhere in the common plane of the screws (X-Y position). The screws 34, 36 may be accessed from the outside of the housing 30 via slots 42 and may be provided with a tool feature like a slot or slots formed in the ends of the screws to accommodate a tool. The housing 30 may be affixed to the hoistway wall 21*a* via any suitable mechanism, fastener, adhesive, and so on.

The screws 34, 36 may be rods, along which the magnet 20 is permitted to slide in any X-Y direction to assume a position within the housing 30. The rods 34, 36 may be accessible from the outside of the housing 30 via slots 42.

Alternatively, the magnets 20 can be adjusted by a motor or motors (not shown), like a stepper motor, wherein the magnet 20 can be moved via inputs from an operator directly via wire or wireless communication or automatically via the controller 24 or a remote computer (not shown) via a diagnostic routine that is run to optimize the position of the magnet, for example on a predetermined schedule.

Installation of the magnet 20 therefore can be performed without the need to locate the magnet precisely initially, as once the car 11 is positioned correctly in relation to the hoistway doorway and the sensor is positioned on the car and actuated or placed into an active sensing condition, the magnet 20 can be adjusted, while monitoring the signal strength generated by the sensor to quickly optimize the position of the magnet within the magnet housing 30. After final positioning, the magnet 20 can be fixed in place permanently or semi-permanently so as to provide for subsequent fine tuning or adjustments during maintenance when needed, or indicated by deterioration of the sensed signal, or at scheduled intervals, for example. Affixing of the magnets 20 may be accomplished via any suitable fastening mechanism, adhesive, set screw, or the like. The magnets 20 may be of any suitable magnetic material, such as neodymium.

Figure 3:
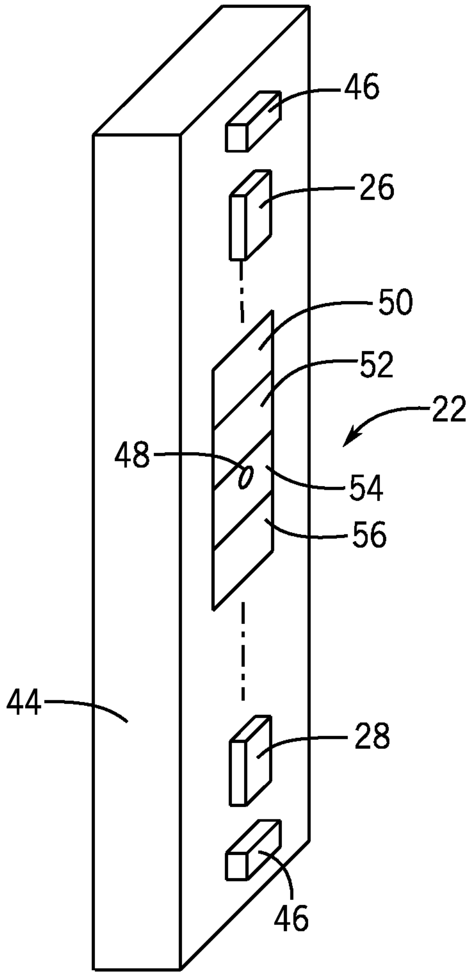
FIG. 3 is a GMR sensor array.

Turning to FIG. 3, the GMR array 22 may, in a specific embodiment, include a pair of vertically spaced GMR sensors 26, 28. Giant magnetoresistance (GMR) is a quantum mechanical magneto-resistance effect observed in a multilayered thin film structure, for example. The thin films alternate between ferromagnetic and non-magnetic materials. When a magnetic field is present, the electrical resistance of the layered structure decreases significantly due to the spinning or scattering of electrons in the layers. Because GMR operates over a great distance relative to, for example, Hall-effect sensors (1-6 inches (in) vs. about 1-millimeter (mm)) GMR sensors are not required to operate according to the same extremely close positional requirements as that of prior art devices. In one embodiment, the sensors 26, 28 are supplied on a printed circuit board (PCB) 44 with associated electronics configured to support operation of the GMR array 22.

The electronic components of the GMR array 22 may be located on the PCB 44 and may include modules for controlling the system, processing the signals from the sensors 26 with a processor 50, amplifying the signals from the sensors with an instrument amplifier 52, providing indications of the status of the system including warning indications with an indicator system 54, and a communications module 56 for communication functions. The above modules can be incorporated into a single integrated unit or can be separate electronic modules as is known. Further, particularly in magnetically noisy environments, it may be beneficial to provide bias magnets 46 near or outside the GMR sensors 26, 28 and positioned upon or near the PCB 44.

The housing for the GMR array 22 may include a) LED or similar indicator 48 that is illuminated when alignment is optimized b) warning indication when the position system senses, for example, that the car exit is not properly aligned to the hoistway door according to a predetermined specification (within a few millimeters, for example). The warning indicator 48 may be located in the cabin of the car 11 where it is viewable by passengers inside the car and/or on the PCB 44. In the event of a misalignment of the car 11 to a doorway in the hoistway 14, the indicator 48 is caused to be illuminated when the controller 24 detects the misalignment, by comparing the misalignment of the GMR array 22 to a corresponding magnet 20 to a predetermined specification corresponding to a proper alignment.

Referring to FIG. 1, in one example, the control system 24 may be configured as the primary system for operating car 11 via the lift mechanism 18 and generating signals to position the car within hoistway 14 at various floors landings relying on information from the sensor 22. However, sensor 22 may be used as a way of merely confirming the position of the car 11. Actions and adjustments can be performed if warranted based on the confirmatory information from sensor 22.

The control system 24 controls lift mechanism 18, causing it to raise and lower car 11 based on a variety of inputs and conditions. One of those inputs in the illustrated embodiment is a signal from sensor 22 that indicates the position of the sensor relative to a target magnet 20. Other inputs may include passenger controls inside car 11 (not shown) and elevator call buttons on each floor adjacent to hoistway 14 (not shown) as is well known.

Control system 24 processes these inputs to generate outputs for controlling lift mechanism 18 and for other purposes as is understood by those skilled in the art. In various embodiments, this processing may occur in a general-purpose processor in communication with memory that is encoded with programming instructions executable by the processor to achieve the described functionality. In other embodiments, the processing is managed by an application-specific integrated circuit (ASIC), field-programmable gate array (FPGA), or other circuitry as will occur to those skilled in the art. This processing portion of control system 24 may be comprised of one or more components configured to operate as a single unit. When of a multi-component form, the control system 24 may have one or more processor components located remotely relative to the others. One or more components of the processor may be of the electronic variety including digital circuitry, analog circuitry, or both. In some embodiments, the processor is of a conventional, integrated circuit microprocessor arrangement. In alternative embodiments, one or more reduced instruction set computer (RISC) processors, application-specific integrated circuits (ASICs), general-purpose microprocessors, programmable logic arrays, or other devices may be used alone or in combination as will occur to those skilled in the art.

In other embodiments, the elevator car controller 24 may be located remotely from the elevator car 11, for example, in the hoistway wall 21*a* or 21*b*. The elevator car controller 24 may be used to communicate with other components of an elevator system 10. In one example, the elevator car controller 24 may be a controller that is positioned within a control panel (not shown), including a microprocessor, a microcontroller, a central processing unit (CPU), and/or any other type of computing device (not shown). However, additional control systems or components that direct information through the use of signals to other control systems may also be used for the elevator car controller 24. The elevator car controller 24 may be in wireless communication with a master controller (not shown). The master controller may receive and/or communicate information from the elevator car controller 24 regarding the current position of the elevator car and/or the travel rate of the elevator car, among other information regarding the elevator car, using signals acquired from the GMR array 22.

The master controller may be in wired and/or wireless communication with each separate elevator car 11 included in the elevator system 10. It is also contemplated that the master controller may be the elevator car controller or may be housed in one of the elevator cars of the elevator system 10. The master controller may be in wired and/or wireless communication with at least one user interface (not shown) provided at one or more of a plurality of loading stations (not shown) within the building for passengers to enter and exit the elevator car. In one example, the user interface may be a control panel or similar display that allows a user to select a desired destination and route within the building. The user interface may include a CPU or other controller in wireless communication with the master controller. Information from the master controller regarding the elevator car may be received by the user interface. It is also contemplated that each elevator car controller may be in wireless communication with the user interface. Each elevator car controller may transmit information regarding the elevator car directly to the user interface.

Figure 4:
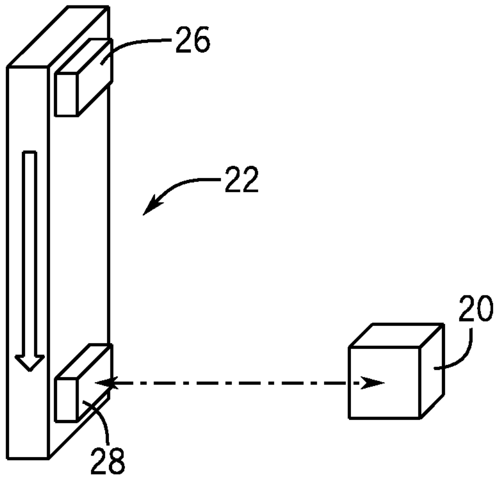
FIGS. 4-6 are a GMR sensor array in different positions relative to a magnet.
Figure 5:
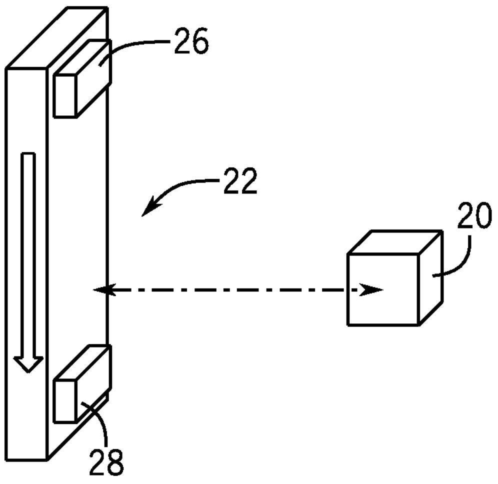
Figure 6:
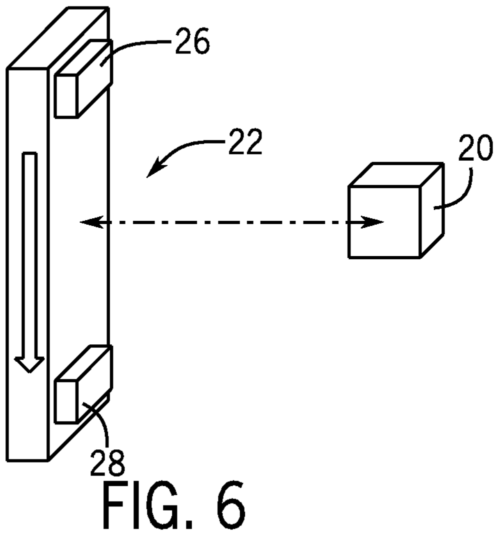

In use, as an elevator car 11 moves in a hoistway 14, the motion of the car causes the GMR array to approach magnet 20. As shown in FIGS. 4-6, in a scenario when car 11 and GMR sensor array 22, is descending, a first one 28 of the GMR sensors 22 is brought into range of the magnetic field of the magnet 20 whereby a signal is generated indicative of the approach of the magnet, the signal of which appears at point A in FIG. 7. The signal is a voltage output proportional to the magnets position relative to the respective sensor. In FIG. 4, the sensor 28 produces a maximum possible signal (the leftmost curve in FIG. 7) because the magnet 20 is at its closest proximity to sensor 28.

Figure 7:
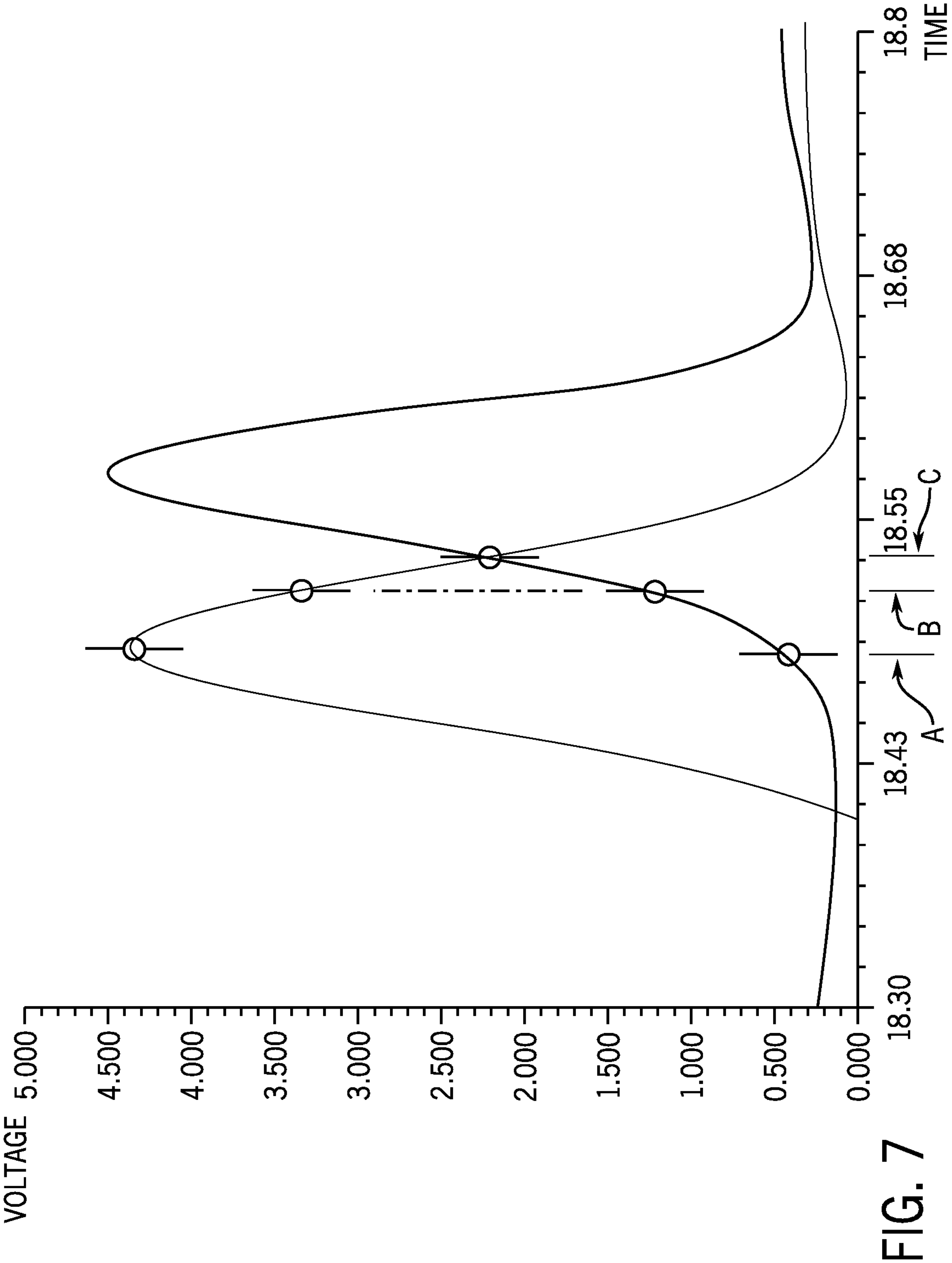
FIG. 7 is an exemplary signal output of a GMR sensor array corresponding to an elevator car with a GMR sensor array moving past a magnet.

FIG. 5 shows a scenario, with the car 11 descending where the magnet 20 is between sensors 28 and 26, but closer to sensor 28, thus generating a pair of signals shown at point B in FIG. 7. One can see that the magnet is departing from the close arrangement of FIG. 4 and approaching sensor 26, whereby the signal generated by sensor 26 is rising.

FIG. 6 shows a scenario, with the car 11 descending where the magnet 20 is halfway between sensors 28 and 26, thus generating the signals shown at point C in FIG. 7. At point C, the system 10 can be configured such that when the signals from both sensors 26, 28 are equal, the car 11 is deemed to be in the desired position for safe ingress and egress to and from the elevator car. In other words, the scenario shown in FIGS. 6 and 7 correspond to a predetermined or selected aligned condition or configuration of the elevator car 11 to a respective exit/entry point.

Figure 8:
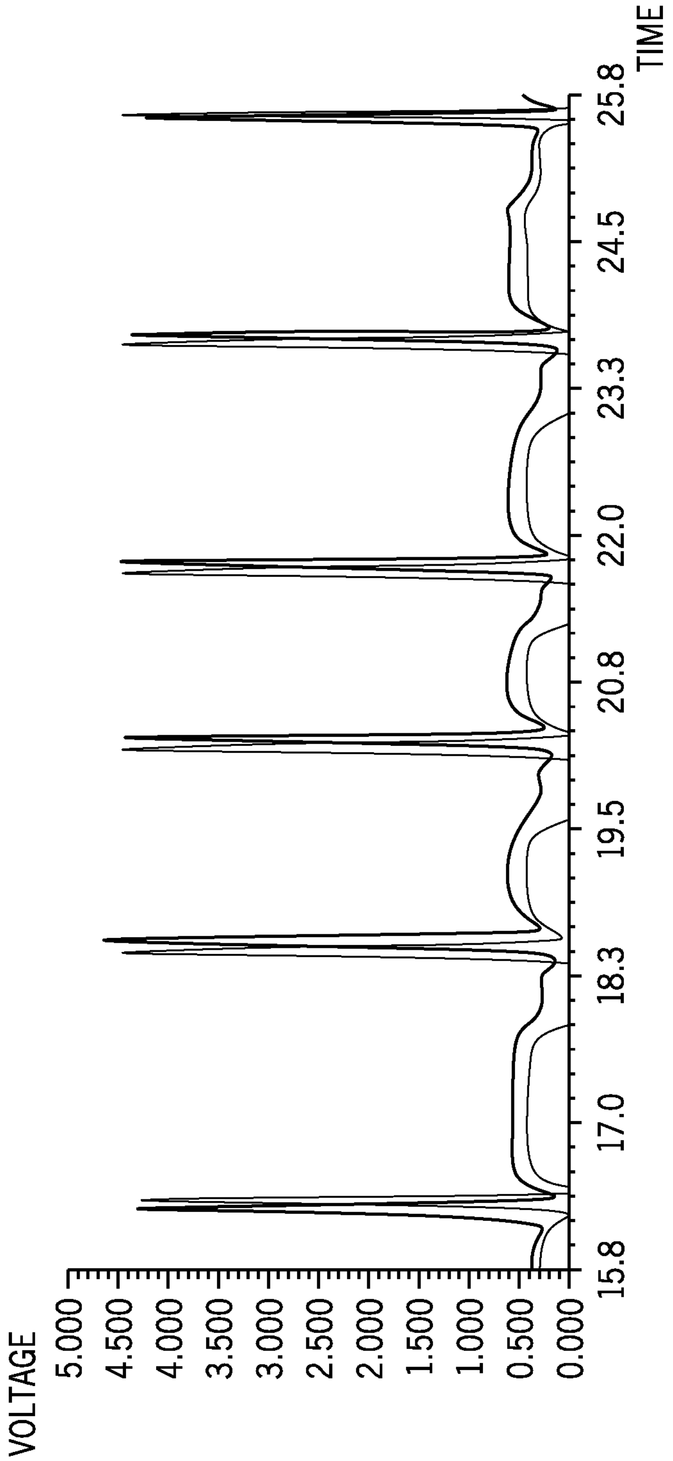
FIG. 8 is an exemplary signal output of a GMR sensor array traveling past several magnets wherein the direction of movement can be derived by the order of signals.

Referring to FIG. 8, as the elevator car 11 travels past the magnets at each floor, one will see the direction the car traveled, which is a function of which signal curve precedes the other curve. In other words, the order of the signal indicative of magnet detection is a function of the direction of travel of the elevator car and thus the sensor array 22. In this manner, the system 10 can be configured to determine the direction of travel of the elevator car. This is one example of data being derived from the positioning system 19 that is not just position data, but directional data.

Figure 9:
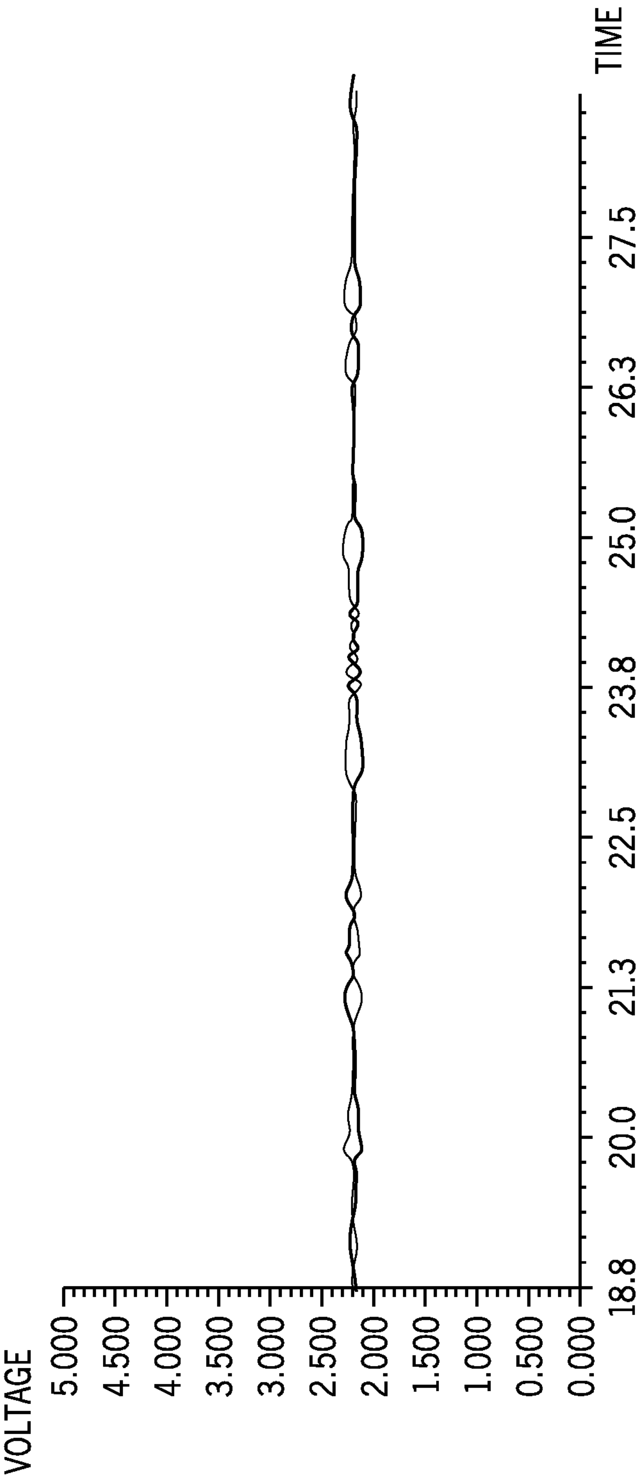
FIG. 9 is an exemplary signal output of a GMR sensor array wherein the elevator car is "bouncing" above and below a desired position.
Figure 10:
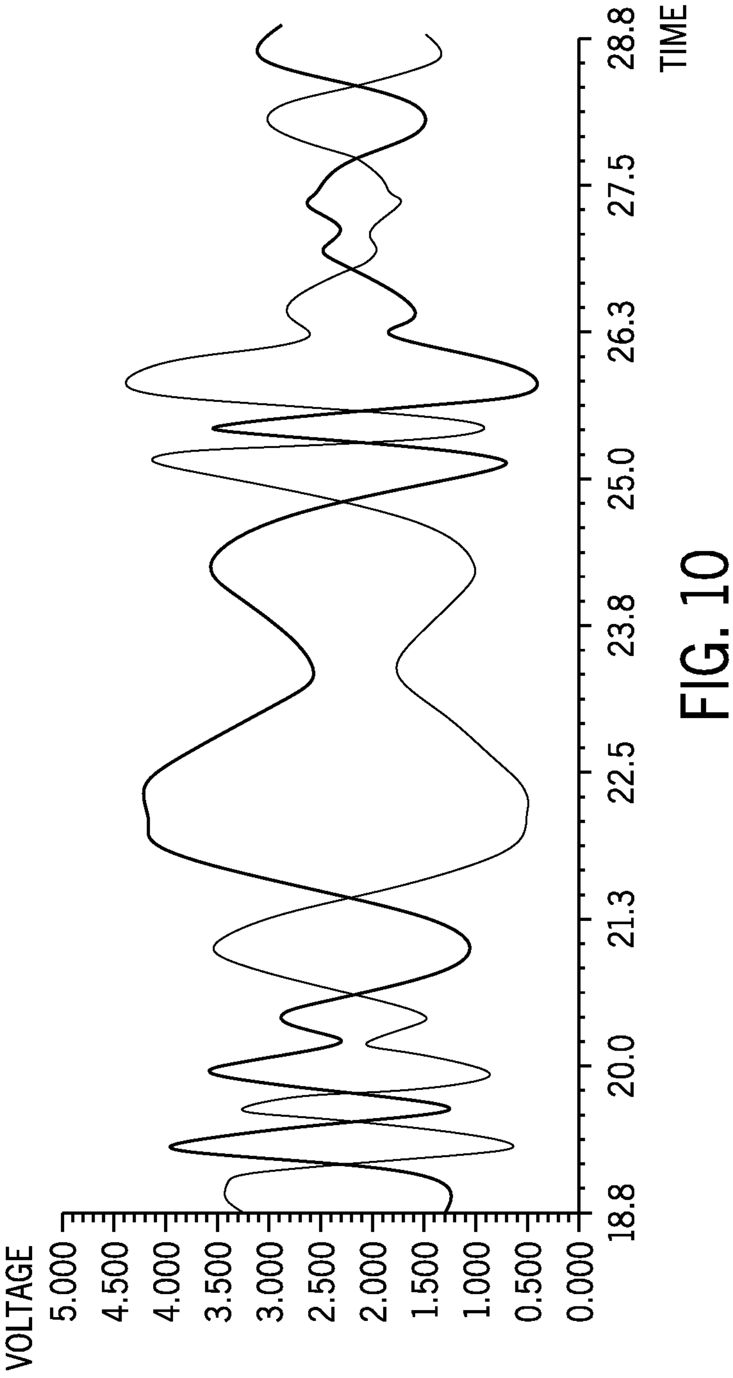
FIG. 10 is an exemplary signal output of a GMR sensor array wherein an occupant is deflecting the car position by "jumping up and down" in the car to illustrate the sensitivity of the present invention.

FIGS. 9 and 10 respectively show the detected movement of an elevator car 11 using the positioning system 19 of the present disclosure. FIG. 9 shows the typical movement of an elevator car 11 at a floor. The signals from two sensors show the sensitivity of the detection of the system 19. Also, FIG. 10 shows how much movement is detected when a passenger in the elevator car moves the car by actively jumping in the car. The sensitivity of the present positioning system 19 would be able to generate signals that enable the elevator system 10 to compensate for such unwanted and potentially hazardous movement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An elevator car positioning system, comprising:

a plurality of magnetic field producers, at least one of the plurality of magnetic field producers located in a position corresponding to each of a plurality of entry/exit point of an elevator system, at least one screw positioned horizontally and at least one screw positioned vertically that are operationally connected with at least one of the plurality of magnetic field producers to enable an X-Y adjustment of the at least one of the plurality of magnetic field producers;

a giant magnetoresistance (GMR) sensor disposed on an elevator car of the elevator system so as to detect separately individual ones of the plurality of magnetic field producers when within a detection range of the GMR sensor and generate detection signals indicative thereof; and a controller in communication with the GMR sensor configured to receive the detection signals from the GMR sensor, determine a position of the elevator car relative to the entry/exit point based on the received detection signals, and generate control signals to position the elevator car.

2. The elevator car positioning system of claim 1, wherein the plurality of magnetic field producers are magnets.

3. The elevator car positioning system of claim 2, wherein each of the magnets is individually disposed within a separate housing.

4. The elevator car positioning system of claim 3, wherein each housing comprises an X-Y adjuster having at least one screw positioned horizontally and at least one screw positioned vertically.

5. The elevator car positioning system of claim 4, wherein the X-Y adjuster is configured to enable manual adjustment of the position of the magnet within the housing.

6. The elevator car positioning system of claim 1, wherein the GMR sensor includes an array of GMR sensors.

7. The elevator car positioning system of claim 6, wherein the GMR sensor array includes a pair of spaced GMR sensors.

8. The elevator car positioning system of claim 7, wherein the pair of GMR sensors are vertically spaced apart.

9. The elevator car positioning system of claim 8, wherein the GMR sensor includes a pair of spaced bias magnets.

10. The elevator car positioning system of claim 1, wherein the GMR sensor includes a pair of vertically spaced GMR sensors, wherein each of the plurality of magnetic field producers and the GMR sensor being positioned such that when the elevator car is positioned at a corresponding exit/entry position of the elevator system, each of the pair of GMR sensors generates an equal voltage output signal.

11. An elevator system, comprising:

a hoistway comprising a plurality of entry/exit points;

an elevator car movable within the hoistway;

a hoisting motor configured to move the elevator car;

a plurality of magnetic field producers, at least one of the plurality of magnetic field producers located in a position corresponding to each of the plurality of the entry/exit points, at least one screw positioned horizontally and at least one screw positioned vertically that are operationally connected with at least one of the plurality of magnetic field producers to enable an X-Y adjustment of the at least one of the plurality of magnetic field producers;

a giant magnetoresistance (GMR) sensor disposed on the elevator car so as to separately detect individual ones of the plurality of magnetic field producers when within a given detection range of the GMR sensor and generate detection signals; and a controller in communication with the GMR sensor and the hoisting motor, the controller configured to receive the detection signals from the GMR sensor, determine a position of the elevator car relative to the entry/exit point based on the received detection signals, and generate control signals to position the elevator car at the entry/exit point via operation of the hoisting motor.

12. The elevator system of claim 11, wherein the plurality of magnetic field producers are magnets.

13. The elevator system of claim 12, wherein each of the magnets is individually disposed within a separate housing.

14. The elevator system of claim 13, wherein each housing comprises an X-Y adjuster having at least one screw positioned horizontally and at least one screw positioned vertically.

15. The elevator system of claim 14, wherein the X-Y adjuster is configured to enable manual adjustment of the position of the magnet within the housing.

16. The elevator system of claim 11, wherein the GMR sensor includes an array of GMR sensors.

17. The elevator system of claim 16, wherein the GMR sensor array includes a pair of spaced GMR sensors.

18. The elevator system of claim 17, wherein the pair of GMR sensors are vertically spaced apart.

19. The elevator system of claim 18, wherein the GMR sensor includes a pair of spaced bias magnets.

20. The elevator system of claim 11, wherein the GMR sensor includes a pair of vertically spaced GMR sensors, wherein each of the plurality of magnetic field producers and the GMR sensor being positioned such that when the elevator car is positioned at a corresponding exit/entry position of the elevator system, each of the pair of GMR sensors generates an equal voltage output signal.

* * * * *